United States Patent
Lee et al.

(10) Patent No.: US 8,379,092 B2
(45) Date of Patent: Feb. 19, 2013

(54) SYSTEM AND METHOD FOR PROVIDING APPLICATION SERVICE USING IMAGE DATA

(75) Inventors: Yun Kyung Lee, Daejeon (KR); Jong Wook Han, Daejeon (KR); Geon Woo Kim, Daejeon (KR); Deok Gyu Lee, Yongin (KR); Kyo Il Chung, Daejeon (KR); Jong Soo Jang, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 399 days.

(21) Appl. No.: 12/678,967

(22) PCT Filed: May 14, 2008

(86) PCT No.: PCT/KR2008/002660
§ 371 (c)(1),
(2), (4) Date: Mar. 18, 2010

(87) PCT Pub. No.: WO2009/038267
PCT Pub. Date: Mar. 26, 2009

(65) Prior Publication Data
US 2010/0208083 A1   Aug. 19, 2010

(30) Foreign Application Priority Data
Sep. 21, 2007 (KR) .................. 10-2007-0096511

(51) Int. Cl.
*H04N 5/225* (2006.01)
(52) U.S. Cl. ............. 348/207.99; 348/222.1; 348/207.1; 348/552

(58) Field of Classification Search ............... 348/222.1, 348/207.99, 207.1, 552
See application file for complete search history.

(56) References Cited

U.S. PATENT DOCUMENTS

| | | |
|---|---|---|
| 6,829,378 B2 | 12/2004 | DiFilippo et al. |
| 2003/0208563 A1 | 11/2003 | Acree et al. |
| 2005/0120128 A1* | 6/2005 | Willes et al. .................. 709/232 |
| 2007/0268121 A1* | 11/2007 | Vasefi et al. .................. 340/506 |

FOREIGN PATENT DOCUMENTS

| | | |
|---|---|---|
| JP | 2006-058943 | 3/2006 |
| KR | 10-2000-0014600 A | 3/2000 |
| KR | 10-0267727 B1 | 7/2000 |
| KR | 10-2001-0001274 A | 1/2001 |
| KR | 10-2003-0060826 A | 7/2003 |
| KR | 10-0668383 B1 | 1/2007 |
| KR | 10-0695007 B1 | 3/2007 |

* cited by examiner

*Primary Examiner* — Yogesh Aggarwal
(74) *Attorney, Agent, or Firm* — Blakely, Sokoloff, Taylor & Zafman

(57) ABSTRACT

There is provided a system and method for providing an application service using image data. One image data processing server collects images (for example, still images and moving images) captured by various kinds of image capturing apparatuses, such as CCTV systems and processes the collected images into data required to provide application services. A plurality of application service servers only provide processed data of the image data processing server without requiring an additional process to a display device of a user. Accordingly, the configuration of each of the application service servers is simplified to thereby reduce manufacturing costs.

4 Claims, 5 Drawing Sheets

SYSTEM AND METHOD FOR PROVIDING APPLICATION SERVICE USING IMAGE DATA

This is a non-provisional application claiming the benefit of International application number PCT/KR2008/002660 filed May 14, 2008.

TECHNICAL FIELD

The present invention relates to a system and method that processes an image captured by an image capturing apparatus into data appropriate for an application service, and provides the data to a user device, for providing an application service using image data and more particularly, to a system and method that causes one image data processing server to collect an image captured by an image capturing apparatus, such as a CCTV system, a camera, or a camcorder, processes the collected data into image data or non-image data appropriate for various kinds of application services, and provides a user device with the image data or the non-image data processed by one image processing server.

This work was supported by the IT R&D program of MIC/IITA [2006-S-067-02, Title: The Development of Security Technology based on Device Authentication for Ubiquitous Home Network].

BACKGROUND ART

According to existing image-related services, an image captured on CCTV (closed circuit TV) is directly transmitted to a limited image information outputting device so that a user can diagram the transmitted image in real time, or the captured image is stored in a storage device so that the user can diagram the stored image at a desired time.

Further, in addition to the CCTV, an image captured by an image capturing apparatus, such as a camera and a camcorder, is directly transmitted to an output device that is connected the image capturing apparatus, or the captured image is moved to a different output device by a user so that the user can directly diagram the corresponding image.

Further, even though the image capturing apparatus, such as the CCTV system, the camera, and the camcorder, is connected through the Internet, a person who has installed the CCTV system or only a few people who are permitted by the person having installed the CCTV system are allowed to diagram a screen. Further, the captured image is directly displayed on the screen.

DISCLOSURE OF INVENTION

Technical Problem

There is a problem in that images captured by the above-described image capturing apparatuses, such as CCTV systems, cameras, and camcorders, are not reused and efficient information sharing is not enabled. Also, there is another problem in that the key infrastructure, such as CCTV, is not sufficiently utilized.

An aspect of the present invention provides a technology that captures images by using various kinds of image capturing apparatuses, such as CCTV systems, collects the captured images, receives and safely stores the collected images, processes the stored images according to purposes and characteristics of application service servers, and transmits the processed images to the application service servers.

Technical Solution

According to an aspect of the present invention, there is provided an image data processing server, the image data processing server including: an image transmitting and receiving unit collecting image data, receiving requests for data required to provide application services from a plurality of individual application service servers, and transmitting processed data at the request of the application service servers; an image compressing and decompressing unit decompressing the collected image data into the original image data and compressing the processed data; and an image processing unit processing the original image data into the data required to provide the application services to generate the processed data.

The image processing unit processes the original image data into image data or non-image data according to types of data required for the plurality of individual application service servers.

According to another aspect of the present invention, there is provided a system for providing an application service using image data, the system including: one image data processing server collecting various types of image data, receiving a request for data required to provide an application service, and processing the collected image data to generate processed data in response to the request; and at least one application service server requesting the data required to provide the application service to the image data processing server, receiving processed data corresponding to the data required to provide the application service from the image data processing server, and providing the received data to a user device The system further includes at least one image capturing apparatus capturing the various types of image data to provide the captured image data to the image data processing server The at least one image capturing apparatus may include an image capturing device including an image capturing unit capturing an image and an image transmitting unit transmitting the captured image; and an image collecting device including an image collecting unit collecting and storing the transmitted image, an image compressing unit compressing the collected image, an image transmitting unit transmitting the compressed image to the image data processing server, and an image capturing control unit controlling the image capturing device.

The one image data processing server may include an image transmitting and receiving unit collecting image data from the at least one image capturing apparatus, receiving a request for data required to provide an application service from the at least one application service server, and transmitting processed data generated at the request thereof to the corresponding application service server; an image processing unit de-compressing the collected image data into the original image data and compressing processed data; and an image processing unit processing the original image data into data required to provide the application service to generate the processed data.

The image processing unit may processe the original image data into image data or non-image data according to types of data required for the at least one application service server.

The at least one application service server may include a data receiving unit receiving the processed data generated from the one image data processing server; a data decompressing unit decompressing the received processed data into the original image data; and a data outputting unit providing the application service requested by the user device by using the decompressed data.

According to another aspect of the present invention, there is provided a method for providing an application service by one image data processing server for providing application services at the request of a plurality of application service servers, the method including: receiving requests for data required to provide the application services from the plurality of individual application service servers; collecting image data captured and compressed by at least one image capturing apparatus; decompressing the collected compressed image data into the original image data; processing the original image data into the data required to provide the application services by combining and reconfiguring the original image data; and compressing processed data corresponding to the data required to provide the application services and transmitting the compressed processed data to the plurality of application service servers.

The processed data may be image data or non-image data.

The plurality of application service servers may decompress the compressed processed data and provide the application services requested by user devices.

Advantageous Effects

As set forth above, the system and method for providing an application service using image data according to the exemplary embodiments of the invention allows unspecified individuals who use an application service server as well as limited users to use necessary image data.

Further, the system and method for providing an application service using image data according to the exemplary embodiments of the invention forms a separate image data processing server that combines image data captured by a plurality of image capturing apparatuses so as to generate more useful information and reduces configurations of application service servers that can receive data or images related to necessary information from the generated information and provide the received data or images to users to thereby reduce manufacturing costs of the application service servers.

BEST MODE FOR CARRYING OUT THE INVENTION

Figure 1:
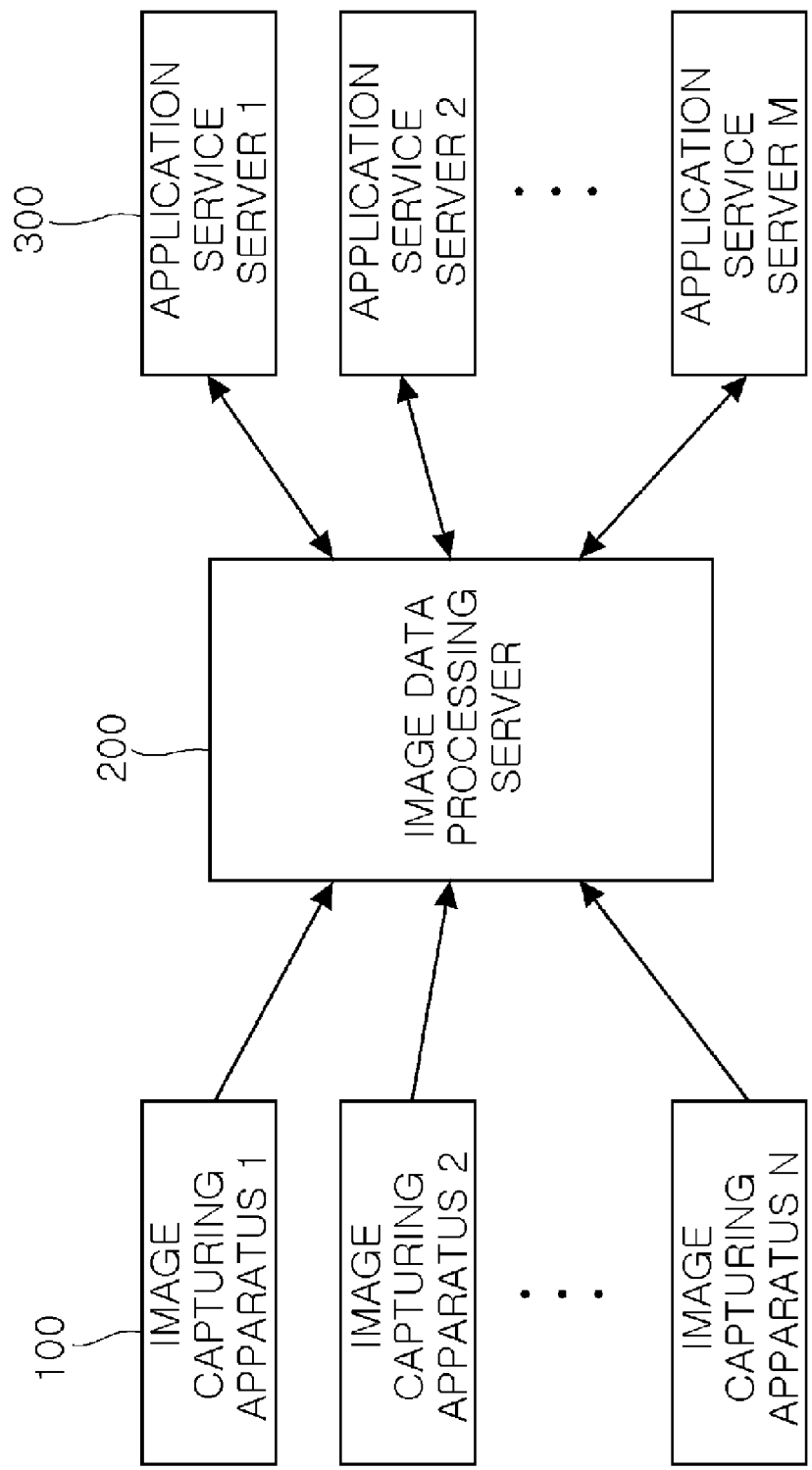
FIG. 1 is a diagram illustrating the entire configuration of a system for providing an application service using image data that processes captured image data into data required to provide the application service according to an exemplary embodiment of the present invention.

Hereinafter, exemplary embodiments of the present invention will now be described in detail with reference to the accompanying drawings.

However, in description of operation principles associated with the embodiments of the present invention, detailed description of a known art or configuration is omitted because it may obscure the spirit of the present invention unnecessarily. In the following description, well-known functions or configurations are not described in detail since they would obscure the invention in unnecessary detail.

Exemplary embodiments of the present invention will now be described in detail with reference to the accompanying drawings.

The invention may however be embodied in many different forms and should not be construed as limited to the embodiments set forth herein. Rather, these embodiments are provided so that this disclosure will be thorough and complete, and will fully convey the scope of the invention to those skilled in the art.

Also, in the drawings, the same reference numerals are used throughout to designate the same or similar components.

In addition, throughout the specification, when it is describe that a part is "connected to" another part, this includes not only a case of "being directly connected to" but also a case of "being electrically connected to", interposing another device therebetween.

Also, when it is described that an apparatus "includes" an element and there is no opposite description thereof, this is not designate that the apparatus excludes other elements but designates that the apparatus may further include other elements.

FIG. 1 is a diagram illustrating the entire configuration of a system for providing an application service using image data according to an exemplary embodiment of the present invention.

As shown in FIG. 1, a system for providing an application using image data includes one image data processing server 200 and a plurality of application service servers (1, 2, . . . , and M, M is natural number) 300. The image data processing server 200 collects image data from various kinds of image capturing apparatuses (1, 2, . . . , and N) 100 and processes the collected image data. The application service servers 300 (1, 2, . . . , and N, N is natural number) provide various kinds of application services.

Here, examples of the image capturing apparatuses 100 may include a CCTV system, a camera, and a camcorder. Each of the image capturing apparatuses 100 includes at least one of the CCTV system, the camera, and the camcorder to capture an image. Further, the image capturing apparatus 100 captures an image and provides the captured image in real time. Further, the image capturing apparatus 100 may collect captured image data for a predetermined period of time and provide the collected image data.

When providing the image data, the image capturing apparatus 100 may compress the captured image data and transmit the compressed image data.

The image data processing server 200 collects image data transmitted by the various kinds of image capturing apparatuses 100. Further, the image data processing server 200 stores the collected image data, appropriately processes the image data into data required to provide application services so that the application service servers 300 can use the processed image data, compresses the processed resultant (images or data), and then transmits the compressed resultant images or data at the request of the application service servers 300.

The plurality of application service servers 300 request data appropriate for the applications services to the image data processing server 200 and receives corresponding compressed processed data. Then, the application service servers 300 decompress the compressed processed data and individually provide the appropriate application services to user devices 400.

Specifically, the image capturing apparatuses 100 that may include the CCTV systems, the cameras, or the camcorders capture images, directly compress the captured images, and transmit the compressed image data, or the image capturing apparatuses 100 collect the captured images, compress the captured images, and transmit the compressed image data, the image data processing server 200 collects the compressed image data.

When the plurality of application service servers 300 request necessary data to the image data processing server 200, the image data processing server 200 combines and reconfigures the compressed image data transmitted by the image capturing apparatuses 100, creates various types of non-image data or image data, compresses the non-image data and the image data, that is, processed data, and transmits the compressed data to the corresponding application service servers 300.

The plurality of application service servers 300 individually request data required to provide the application services to the image data processing server 200, receive the requested data, and provide the application services that are requested by the user devices.

For example, when the application service server 300 that provides traffic information requests data related to the traffic information to the image data processing server 200, the image data processing server 200 collects images captured by CCTV systems that are installed along national highways and expressways. The image data processing server 200 processes the collected images to produce not images but charts or numerical values that indicate current traffic conditions and then, transmits the processed data to the application service server 300.

Then, the application service server 300 provides the processed data (charts or numerical values) received from the image data processing server 200 to the user device 400 to display the processed data. In this way, the application service is available so that the user can be informed in real time about road condition, such as uncongested roads and congested roads.

As another example, the application service server 300 can provide an application service that provides images obtained by capturing a region of interest to the disabled or those who plan to make trips so that they can feel as if they are visiting the region.

To this end, the application service server 300 requests stereoscopic images of the corresponding region to the image data processing server 200. The image data processing server 200 processes the collected images and generates stereoscopic images. Then, when the image data processing server 200 transmits the generated stereoscopic images to the application service server 300, the application service server 300 can display the processed stereoscopic images to the user device 400.

As another example, the application service server 300 can provide an application service as follows. When the user leaves the house, if a person stands at the front door or rings the door bell, images captured by a CCTV system or a network camera are transmitted to the image data processing server 200 and stored. When the image data processing server 200 directly transmits the captured images to the application service server 300, the application service server 300 transmits a notification message to the user or provides the received captured images to the user device 400.

Therefore, according to the exemplary embodiment of the invention, the image data processing server 200 uses the images captured by the image capturing apparatuses 100, such as CCTV systems, cameras, and camcorders, which are installed according to various purposes, and appropriately processes the captured images into data required for application services at the request of the plurality of application service servers 300. Therefore, the application service servers 300 can provide the application services for the new purposes to the user devices without additionally processing the data.

Figure 2:
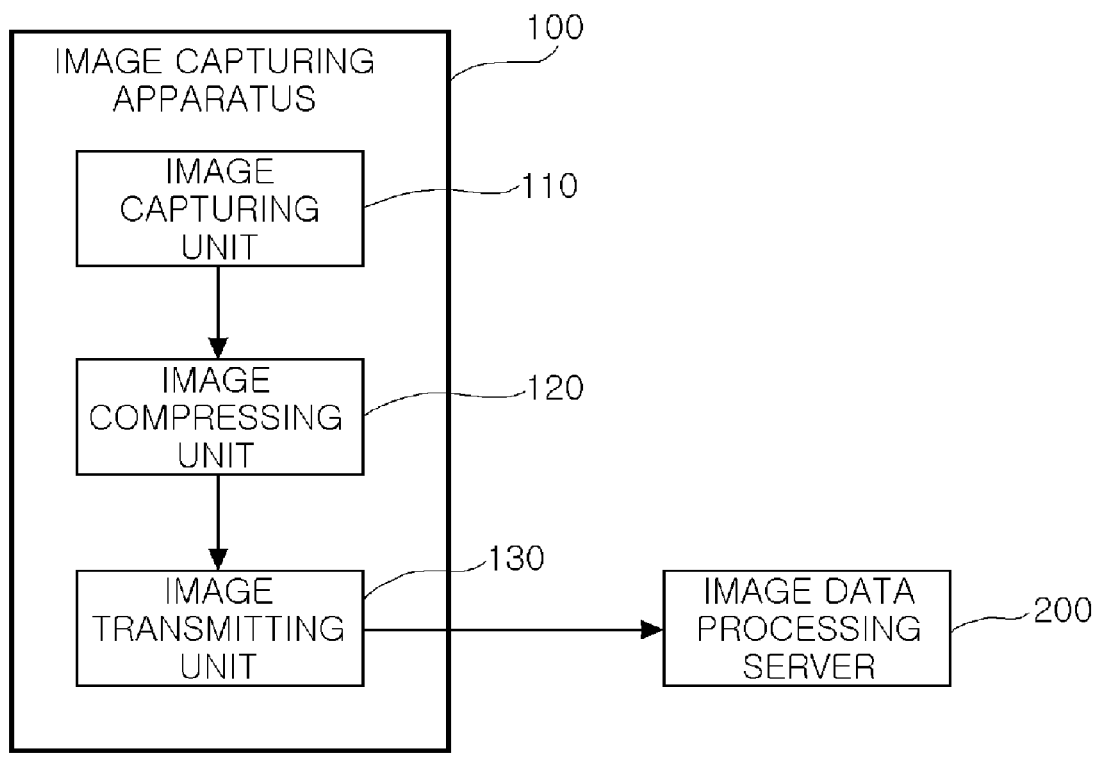
FIG. 2 is a diagram illustrating a detailed configuration of an image capturing apparatus according to an exemplary embodiment of the present invention.

FIG. 2 is a diagram illustrating a detailed configuration of an image capturing apparatus 100 in the system for providing an application service using image data according to the embodiment of the present invention.

Referring to FIG. 2, the image capturing apparatus 100 includes an image capturing unit 110, an image compressing unit 120, and an image transmitting unit 130.

The image capturing unit 110 captures an image and transmits the captured image to the image compressing unit 120. The image compressing unit 120 compresses image data and transmits the compressed image data to the image transmitting unit 130. The image transmitting unit 130 transmits the input image data to the image data processing server 200.

Figure 3:
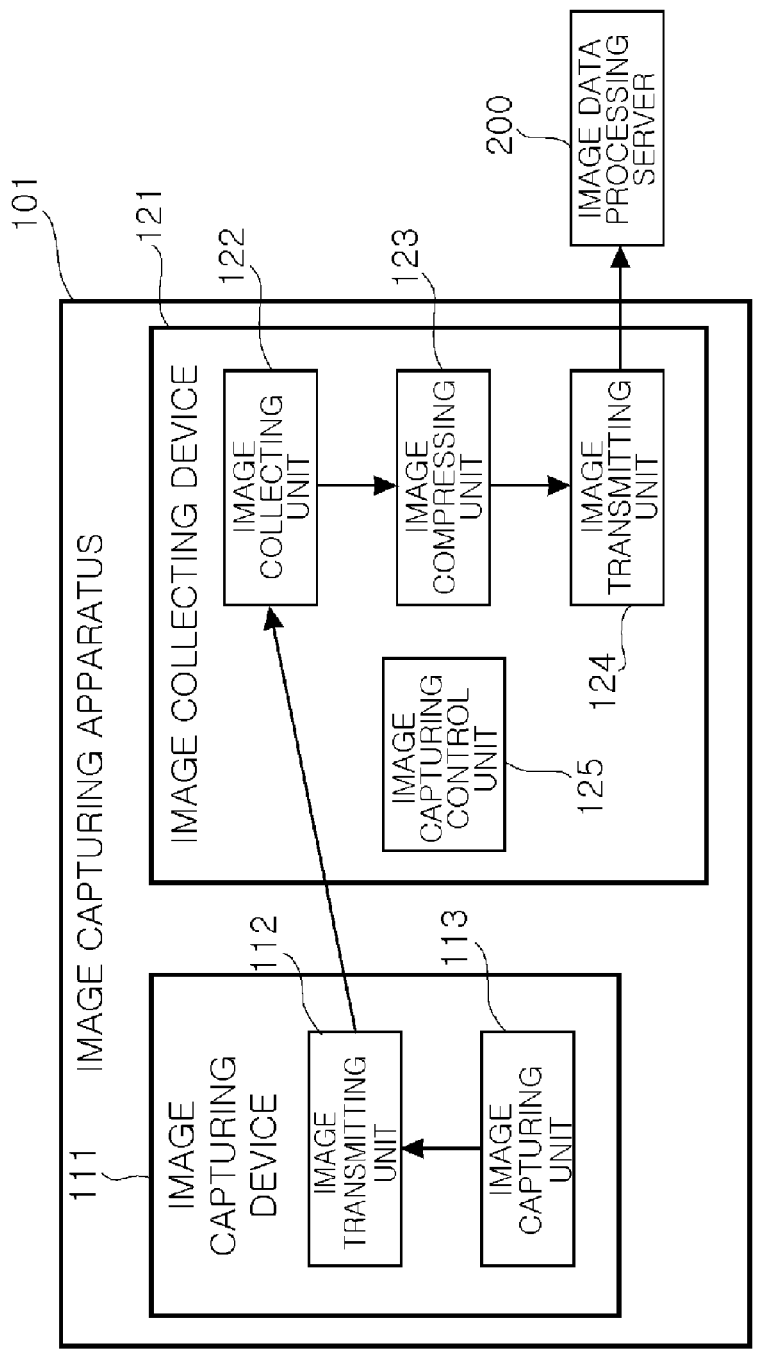
FIG. 3 is a diagram illustrating a detailed configuration of an image capturing apparatus according to another exemplary embodiment of the present invention.

FIG. 3 is a diagram illustrating an image capturing apparatus 101 according to another exemplary embodiment in the system for providing an application service using image data according to the embodiment of the present invention.

Referring to FIG. 3, the image capturing apparatus 101 includes an image capturing device 111 and an image collecting device 121. The image capturing device 111 includes an image capturing unit 112 and an image transmitting unit 113. The image collecting device 121 includes an image collecting unit 122 collecting and storing the captured image, an image compressing unit 123 compressing the collected image, an image transmitting unit 124 transmitting the compressed image to the image data processing server 200, and an image capturing control unit 125 controlling the image capturing device 111.

In the image capturing apparatus 101 having the above-described configuration, the image capturing device 111, such as a CCTV system connected to a network, does not need to include a device, such as a digital video recorder (DVR). The CCTV system only captures an image and transmits the captured image. The image collecting device 121 receives, collects, compresses, and transmits the image to the image data processing server 200.

As shown in the configuration of FIG. 3, the image capturing device 111 that only captures the image and the image collecting device 121 that collects the captured image are separated from each other, thereby reducing the size of capturing equipment, such as the CCTV system.

Figure 4:
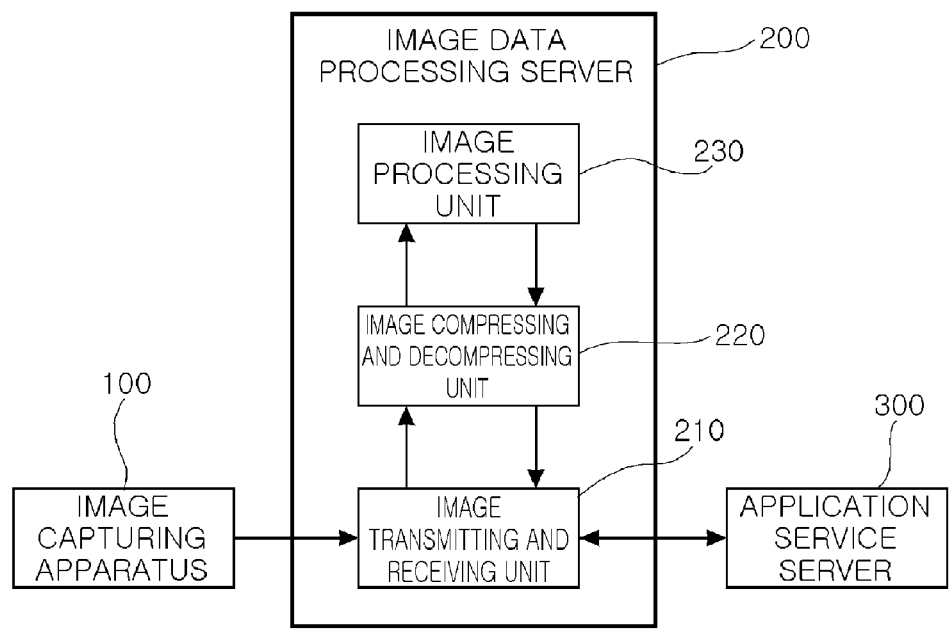
FIG. 4 is a diagram illustrating a detailed configuration of an image data processing server according to an exemplary embodiment of the present invention.

FIG. 4 is a diagram illustrating a detailed configuration of the image data processing server 200 that processes image data and provides data required to provide an application service in the system for providing an application service using image data according to the exemplary embodiment of the invention.

Referring to FIG. 4, the image data processing server 200 includes an image transmitting and receiving unit 210, an image compressing and decompressing unit 220, and an image processing unit 230.

The image transmitting and receiving unit 210 receives compressed image data from the image capturing apparatus 100 and transmits the image data to the image compressing and decompressing unit 220. Then, the image transmitting and receiving unit 210 receives processed data of the image processing unit 230 that is compressed by the image compressing and decompressing unit 220 and transmits the processed data to the corresponding application service server 300.

The image compressing and decompressing unit 220 decompresses the compressed image data inputted from the image transmitting and receiving unit 210 into the original image data and transmits the original image data to the image processing unit 230. Then, the image compressing and decompressing unit 220 compresses the processed data of the image processing unit 230 to transmit the compressed data to the application service server 300.

The image processing unit 230 selects image data necessary according to the purpose of the application service server 300, processes the selected image data into image data, such as stereoscopic images, or non-image data, such as charts or numeral values, and then transmits the image data or the non-image data to the image compressing and decompressing unit 220.

Figure 5:
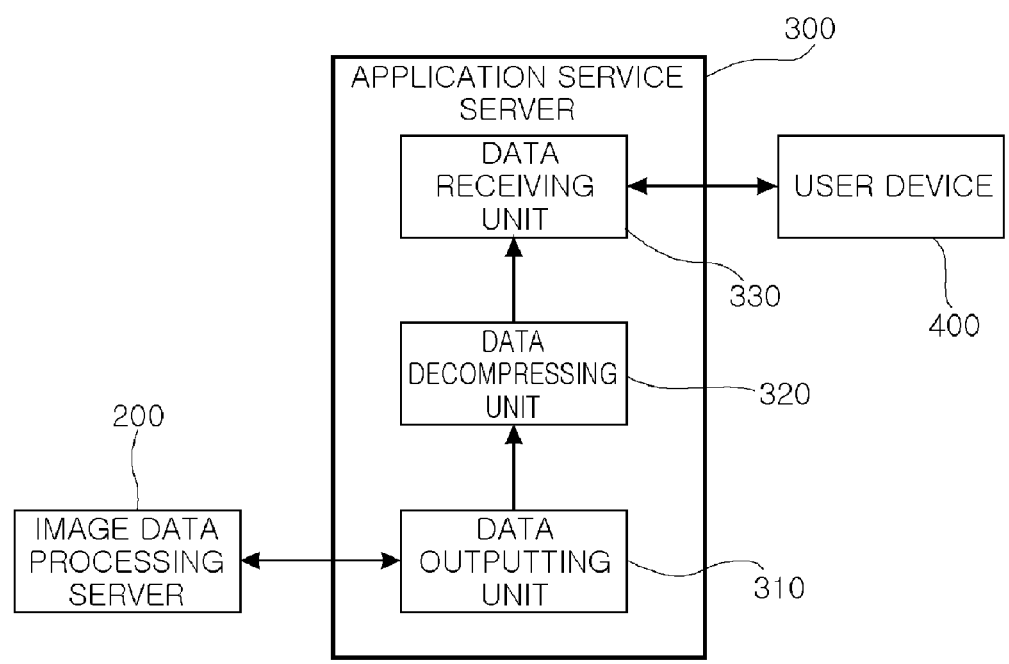
FIG. 5 is a diagram illustrating a detailed configuration of an application service server according to an exemplary embodiment of the present invention.

FIG. 5 is a diagram illustrating a detailed configuration of the application service server 300 that provides processed data to the user device 400 in the system for providing an application service using image data according to the embodiment of the present invention.

Referring to FIG. 5, the application service server 300 includes a data receiving unit 310, a data decompressing unit 320, and a data outputting unit 330.

The data receiving unit 310 receives the image data or the non-image data, such as charts or numerical values, which are processed and compressed, from the image data processing server 200, and transmits the received image data or non-image data to the data decompressing unit 320.

The data decompressing unit 320 decompresses the transmitted image data or non-image data that are processed and compressed into the original processed image data or non-image data and transmits the original processed image data or non-image data to the data outputting unit 330.

Further, when the data receiving unit 310 receives the non-image data from the image data processing server 200, the data receiving unit 310 may temporarily store the data in a storage device (not shown) and transmit the stored data to the data outputting unit 330.

The data outputting unit 330 displays the data stored in the storage device (not shown) to the user device 400 so that the user can obtain necessary data.

While the present invention has been shown and described in connection with the exemplary embodiments, it will be apparent to those skilled in the art that modifications and variations can be made without departing from the spirit and scope of the invention as defined by the appended claims.

The invention claimed is:

1. A system for providing an application service using image data, the system comprising:
   one image data processing server collecting various types of image data, receiving a request for data required to provide an application service, and processing the collected image data to generate processed data in response to the request; and
   at least one application service server requesting the data required to provide the application service to the image data processing server, receiving processed data corresponding to the data required to provide the application service from the image data processing server, and providing the received data to a user device; and
   at least one image capturing apparatus capturing the various types of image data to provide the captured image data to the image data processing server,
   wherein the at least one image capturing apparatus comprises:
      an image capturing device including an image capturing unit capturing an image and an image transmitting unit transmitting the captured image; and
      an image collecting device including an image collecting unit collecting and storing the transmitted image, an image compressing unit compressing the collected image, an image transmitting unit transmitting the compressed image to the image data processing server, and an image capturing control unit controlling the image capturing device.

2. The system of claim 1, wherein the one image data processing server comprises:
   an image transmitting and receiving unit collecting image data from the at least one image capturing apparatus, receiving a request for data required to provide an application service from the at least one application service server, and transmitting processed data generated at the request thereof to the corresponding application service server;
   an image compressing and decompressing unit decompressing the collected image data into the original image data and compressing processed data; and
   an image processing unit processing the original image data into data required to provide the application service to generate the processed data.

3. The system of claim 2, wherein the image processing unit processes the original image data into image data or non-image data according to types of data required for the at least one application service server.

4. The system of claim 1, wherein the at least one application service server comprises:
   a data receiving unit receiving the processed data generated from the one image data processing server;
   a data decompressing unit decompressing the received processed data into the original image data; and
   a data outputting unit providing the application service requested by the user device by using the decompressed data.

* * * * *